P. J. NORBERG.
MILKING STOOL.
APPLICATION FILED MAR. 10, 1916.
1,212,386. Patented Jan. 16, 1917.
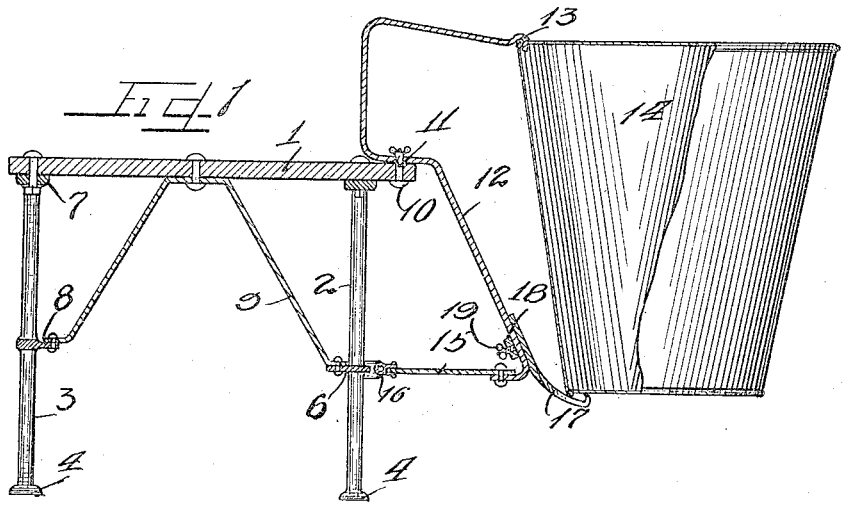
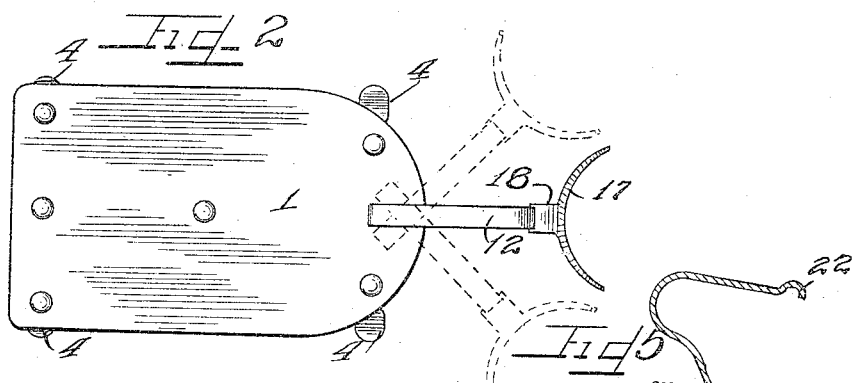
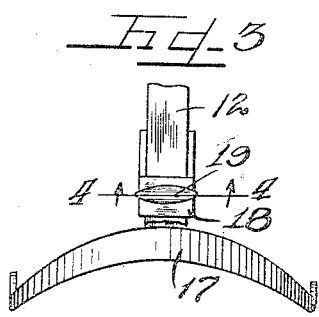
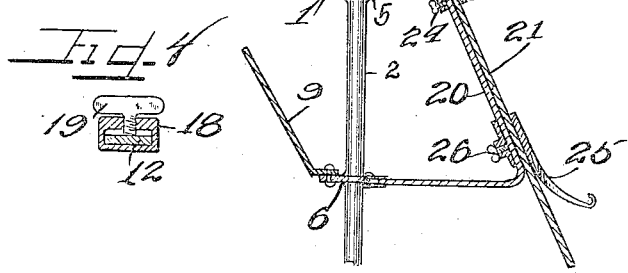
Witnesses
K. J. Tobin
Charles W. Hill Jr. by
Inventor
Peter J. Norberg
Charles W. Hill
Atty.

UNITED STATES PATENT OFFICE.

PETER J. NORBERG, OF NEW ERA, MICHIGAN.

MILKING-STOOL.

1,212,386.  Specification of Letters Patent.  Patented Jan. 16, 1917.

Application filed March 10, 1916. Serial No. 83,256.

*To all whom it may concern:*

Be it known that I, PETER J. NORBERG, a citizen of the United States, and a resident of the city of New Era, in the county of Oceana and State of Michigan, have invented certain new and useful Improvements in Milking-Stools; and I do hereby declare that the following is a full, clear, and exact description of the same, reference being had to the accompanying drawings, and to the numerals of reference marked thereon, which form a part of this specification.

This invention relates to an improved type of milking stool wherein adjustable means is provided thereon to hold pails of different size mounted at the front of the stool convenient for milking purposes.

It is an object therefore of this invention to construct an improved type of milking stool wherein adjustable means is provided for pails of different sizes thereon in a manner to permit a swinging movement of the supported pail with reference to the stool.
It is also an object of this invention to construct a milking stool provided with pivotal means adjustable to receive pails of different sizes engaged therewith to support the pail in a convenient position for milking at the forward end of the stool.

It is furthermore an object of this invention to construct a milking stool provided with adjustable pivotal means on the forward end thereof adapted to support a pail engaged thereon for movement with reference to the stool, and with the elements of the stool so assembled as to permit ready assembly and dismantling thereof when desired.
It is finally an object of this invention to construct an improved type of milking stool simple in construction and operation and operating efficiently for the purpose.

The invention (in a preferred form) is illustrated in the drawings and hereinafter more fully described.

In the drawings: Figure 1 is a central longitudinal section taken through a stool embodying the principles of my invention, illustrating the same engaged with and supporting a pail in operating position. Fig. 2 is a top plan view of the stool illustrating the operation in dotted lines. Fig. 3 is a fragmentary rear exterior view of the lower supporting mechanism for the pail. Fig. 4 is a detail section taken on line 4—4 of Fig. 3. Fig. 5 is a sectional detail illustrating a modified form of adjustable connection for supporting the pail.

As shown in the drawings: The seat of the stool is denoted by the reference numeral 1, and is supported upon four legs, two front legs 2, and two rear legs 3, the lower ends of which are bent out and flattened to afford relatively wide supporting feet 4. The front legs 2, are connected transversely to one another by an integral cross piece 5, at their upper ends, and an integral cross piece 6, near the middle thereof, and similarly the rear legs 3, are connected by an integral cross piece 7, at their upper ends, and another integral cross piece 8, near the middle thereof, said cross pieces being shown in section in Fig. 1. The front and rear legs of the stool are braced by a bracket bar 9, which is riveted at its ends to web extensions of the cross pieces 6 and 8, and with its middle portion bolted or otherwise secured to the under surface of the seat 1.

Pivoted on the forward end of the seat 1, by means of a bolt 10, and wing nut 11, is a pail bracket bar 12, having a forwardly directed upper portion with a hook 13, formed on the outer end thereof adapted to engage over the upper beaded edge of a pail 14, and with the lower end of said bracket inclining outwardly and downwardly and then bent inwardly and riveted to a bar 15. The inner end of said bar 15, is pivoted to a yoke bracket 16, which is connected on the central web extension of the cross piece 6, so that as a consequence said pail bracket 12, may swing into the dotted line positions shown in Fig. 2, upon the respective pivots supporting the same. Slidably mounted upon the lower end of the bracket bar 12, is a crescent shaped supporting member 17, adapted to engage beneath the lower beaded edge of the pail 14. For this purpose a tubular bracket piece 18, is formed integral with said frame member 17, and is of rectangular cross section, through which said bar 12, extends, and as shown in Fig. 4, threaded through the rear wall of said tubular bracket member is a thumb screw 19, which, when threaded inwardly, bears frictionally against the bracket bar 12.

In the modification illustrated in Fig. 5, I have shown a pail bracket 20, pivoted on the forward end of the seat 1, inclining outwardly and downwardly and bent inwardly and pivotally connected to the web extension of the cross piece 6. Slidably mounted upon the bracket bar 20, is a flat bar 21, the upper end of which is bent outwardly and is provided with a hook or beaded end 22, for engagement with the upper end of a pail. Said bar 21, is held adjustably upon the bracket bar 20, by frictional clamping means, one clamp 23, near the upper end of the bar 20, being provided with an adjusting thumb screw 24. Mounted on the lower end of the bracket bar 20, is a crescent shaped bracket 25, similar in construction to the bracket 17, described, having a tubular extension of rectangular section which forms the other clamp, engaging slidably over the respective bars 20 and 21, and provided with an adjusting thumb screw 26, whereby the same may be tightened, and when loosened permitting sliding movement of the bar 21, as well as adjustment of the crescent shaped frame itself.

The operation is as follows: In the form of device illustrated in Figs. 1 to 4 inclusive, the pail or bucket 14, is supported upon the crescent shaped bracket frame 17, and is held stable by the hooked extension 13, of the pivotally mounted bracket bar 12, and the pail may be swung either to the right or left into the dotted line positions of the bracket shown in Fig. 2, when so supported. For pails of different sizes the device may be adjusted, that is, by loosening the thumb screw 19, and shifting the crescent shaped bracket 17, on the pivoted bracket bar 12.

In the modification illustrated in Fig. 5, a double adjustment is provided wherein the upper member which engages the upper end of the pail may be adjusted with reference to its supporting pivot bar, as well as the lower crescent shaped member 25, and after an adjustment of the parts is effected, the same may be held rigidly clamped together by screwing up the thumb screws 24 and 26, respectively.

I am aware that various details of construction may be varied through a wide range without departing from the principles of this invention, and I therefore do not purpose limiting the patent granted otherwise than necessitated by the prior art.

I claim as my invention:

1. In a device of the class described, a stool seat, legs supporting the same, a bracket pivotally mounted on said seat and on the legs thereof, and means associated with said bracket and adapted to engage a pail at the top and bottom, said means being adjustable to engage pails of different sizes.

2. In a milking stool, a seat member, legs supporting the same, a bracket bar pivoted on the forward end of the seat member, a supporting bar pivotally associated with the front legs of the stool and connected to said bracket bar, an extension on the upper end of said bracket bar adapted to engage the upper end of a pail, and means adjustably mounted on the lower end of said bracket bar to engage the lower end of a pail to support said pail in swinging adjustment with reference to said stool.

In testimony whereof I have hereunto subscribed my name in the presence of two subscribing witnesses.

PETER J. NORBERG.

Witnesses:
W. H. CHURCHILL,
A. E. NORBERG.

Copies of this patent may be obtained for five cents each, by addressing the "Commissioner of Patents, Washington, D C."